(12) United States Patent
Murphy et al.

(10) Patent No.: US 6,433,949 B1
(45) Date of Patent: Aug. 13, 2002

(54) SERVO WRITE HEAD

(75) Inventors: Michael E. Murphy, Dexter; Lawrence J. Tucker, Whitmore Lake, both of MI (US)

(73) Assignee: Design & Test Technology, Inc., Ann Arbor, MI (US)

( * ) Notice: Subject to any disclaimer, the term of this patent is extended or adjusted under 35 U.S.C. 154(b) by 0 days.

(21) Appl. No.: 09/612,148

(22) Filed: Jul. 7, 2000

Related U.S. Application Data
(60) Provisional application No. 60/143,240, filed on Jul. 9, 1999.

(51) Int. Cl.[7] .......................... G11B 21/02; G11B 5/584; G11B 5/09
(52) U.S. Cl. .......................... 360/75; 360/48; 360/77.12
(58) Field of Search .......................... 360/61, 46, 73.04, 360/119, 121, 48, 75, 77.12

(56) References Cited

U.S. PATENT DOCUMENTS

| | | | |
|---|---|---|---|
| 4,819,107 A | 4/1989 | Bolt | 360/121 |
| 4,954,921 A | 9/1990 | Bolt | 360/121 |
| 5,892,633 A | 4/1999 | Ayres et al. | 360/73.08 |
| 5,898,534 A | 4/1999 | Gray | 360/77.01 |
| 5,907,564 A | 5/1999 | Jochijms et al. | 714/756 |
| 6,169,640 B1 * | 1/2001 | Fasen | 360/48 |
| 6,172,837 B1 * | 1/2001 | Fasen | 360/75 |

OTHER PUBLICATIONS http://www.storage.ibm.com/hardsoft/tape/lto/prodhd—data/whitehd—11.html, IBM Technology White Paper, 1998 Hewlett–Packard, IBM and Seagate.
File materials for development of a Servo Writer from Design & Test Technology, Inc. and Seagate Technology, Inc. said documents including quotations and purchase orders. Said documnts will be provided forthwith.

* cited by examiner

Primary Examiner—Regina Y. Neal
(74) Attorney, Agent, or Firm—Harness, Dickey & Pierce, P.L.C.

(57) ABSTRACT

A head for writing a plurality of bands. The bands have magnetic transitions onto a magnetic media (110). The magnetic media (110) travels in a preselected direction. The head includes a body support structure (100) and a plurality of write elements (120). The write elements (120) have a fixed alignment in the body support structure (100) that is substantially perpendicular relative to the travel direction of the magnetic media (110).

16 Claims, 5 Drawing Sheets

Prior Art
LTO Format Layout

SERVO WRITE HEAD

CROSS-REFERENCE TO RELATED APPLICATION

The application is based upon and claims priority to United States Provisional Patent Application Ser. No. 60/143,240 filed Jul. 9, 1999, and entitled Servo Write Head, the specification and drawings of which are herein expressly incorporated by reference.

BACKGROUND OF THE INVENTION

1. Field of the Invention

The present invention relates to computer data storage systems. More particularly, the invention relates to magnetic media computer data storage systems.

2. Background and Summary

In magnetic tape systems, information is recorded on the tape by magnetizing magnetic particles impregnated into the tape. This is accomplished through a record head that contains a piece of magnetic material with a coil of wire around it that forms an electromagnet. The information, which one wishes to store, is then applied to the record head in the form of an electrical signal that changes the magnetic field of the electromagnet. Thus, as the tape is passed relative to the record head, the information or data is stored on the tape by magnetizing the aforementioned particles on the tape as the tape passes by.

Data is retrieved from the tape in a similar manner. A tape which has the magnetic impregnated particles magnetized in a fashion directly related to the data is passed by a playback head. Again, a playback head is typically a coil of wire around a magnetic material forming an electromagnet. Depending on the use, the record and playback heads may be one and the same. Thus, as the tape is passed by the head a magnetic field is induced into the magnetic material of the playback head which in turn creates an electrical signal in the coil of wire which is directly related to the data stored on the tape. Obviously, the placement of these heads is important to the storage and retrieval of the information on the tape.

The placement of the heads becomes more important as the desire of the industry for small media storage devices with higher storage capacity increases. Open format tape storage technologies such as the Linear Tape-Open ("LTO") format are directed toward meeting this desire. Specifically the LTO format, provides four separate data bands separated laterally across the width of the tape with five servo bands bracketing the data bands. The data in these servo bands are offset longitudinally along the axis of travel of the tape by specified amounts to allow the tape unit to identify which data band the data heads are positioned over by measuring the timing offset between the upper and lower servo bands bracketing each data band. The longitudinal offsets between adjacent servo bands are +33.33, −33.33, +66.66 and −66.66 ($\mu$m) micrometers. Thus, the encoding of the timing data in the servo bands in this format must be placed with a high degree of accuracy to meet the desired longitudinal offsets.

The LTO format specifies multiple servo positions within each servo band. The number of servo positions depends on the implementation. The distance between two adjacent servo positions corresponds to the distance between the data bands. The space between bands written in opposing directions is called a direction buffer. This space is designed to minimize interference between bands written in opposite directions that arise from variations in tape guiding and servo performance. Open tape formats, such as LTO, combine the advantages of linear multi-channel bi-directional tape formats with improvements in timing based servo control, hardware data compression, optimized band layouts, and efficient error correction routines to maximize capacity and performance. The LTO tape format specifications include the ACCELIS and ULTRIUM specifications. The ACCELIS specification provides a 8 (mm) millimeter wide tape on a dual reel cartridge with high speed access to stored data on two data bands. The ULTRIUM tape format provides a ½ inch wide tape with ultra-high-capacity storage on four data bands.

Tape head movement in the LTO format is controlled by the servo system using information encoded in servo bands bordering both sides of each data band. Two types of information are encoded into the servo bands. The first type of information provides a cross-tape position error signal using the robust Timing Based Servo (TBS). The second type of information provides absolute down-the-tape longitudinal positioning information, which allows the tape to span and maneuver along the length of the band for precise data handling operations. The absolute location down the length of the tape is recorded in longitudinal position (LPOS) marks information encoded into the TBS servo code.

FIG. 1 depicts a representation of the layout of the data bands and servo bands for the LTO format. As shown, there are four data bands each of which is bordered by two adjacent servo bands per the LTO specifications.

With reference to FIG. 2, the previous approach to encoding the aforementioned servo bands onto tape prior to use for data storage was done in the following manner. The head 40 consisted of one large core 20 with a single winding 10. The gaps 30 in the head were then precision machined to give the appropriate longitudinal offsets 50. The previous approach suffers in several respects. First, the task of manufacturing a head with the requisite precision in the placement of the gaps is far from trivial. In fact, failures are common resulting in the heads being discarded due to imprecise placement in the machining of the gaps. Second, since the gaps are distributed longitudinally across the surface of the head, the contact area of the tape head interface is rather large. This ultimately limits the maximum speed that the media can achieve while maintaining proper head to tape contact, which limits the rate at which servo data may be encoded. Finally, in order to achieve the requisite magnetic flux from each of the distributed gaps, the inductance of the single winding in the core must be relatively large. Thus, the head presents a highly inductive load that is difficult for the associated signal electronics to drive, especially as frequency increases. This makes it difficult to achieve a low rise time on the data signal applied to the head. Also, as part of this, any variation in the machining of the gaps or the core resulting in the magnetic flux density emerging from the gaps being unequal is unable to be compensated for due to the common drive signal.

The present invention overcomes the aforementioned disadvantages as well as other disadvantages. In accordance with the teachings of the present invention, a write head having multiple independent servo write cores aligned vertically with reference to the magnetic tape media is provided. All the servo write cores preferably have independent drivers and data generators, allowing them to encode data independently on a magnetic tape media. Each servo write core driver is preferably independently clocked from a precision source so it can be offset with respect to the other write core drivers in precise small steps.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

The following description of the present invention is merely exemplary in nature and is in no way intended to limit the invention or its uses. Moreover, the following description, while depicting a write head designed to operate with the LTO format, is intended to adequately teach one skilled in the art to make and use the write heads of the present invention with any similar or equivalent magnetic recording format.

Figure 1:
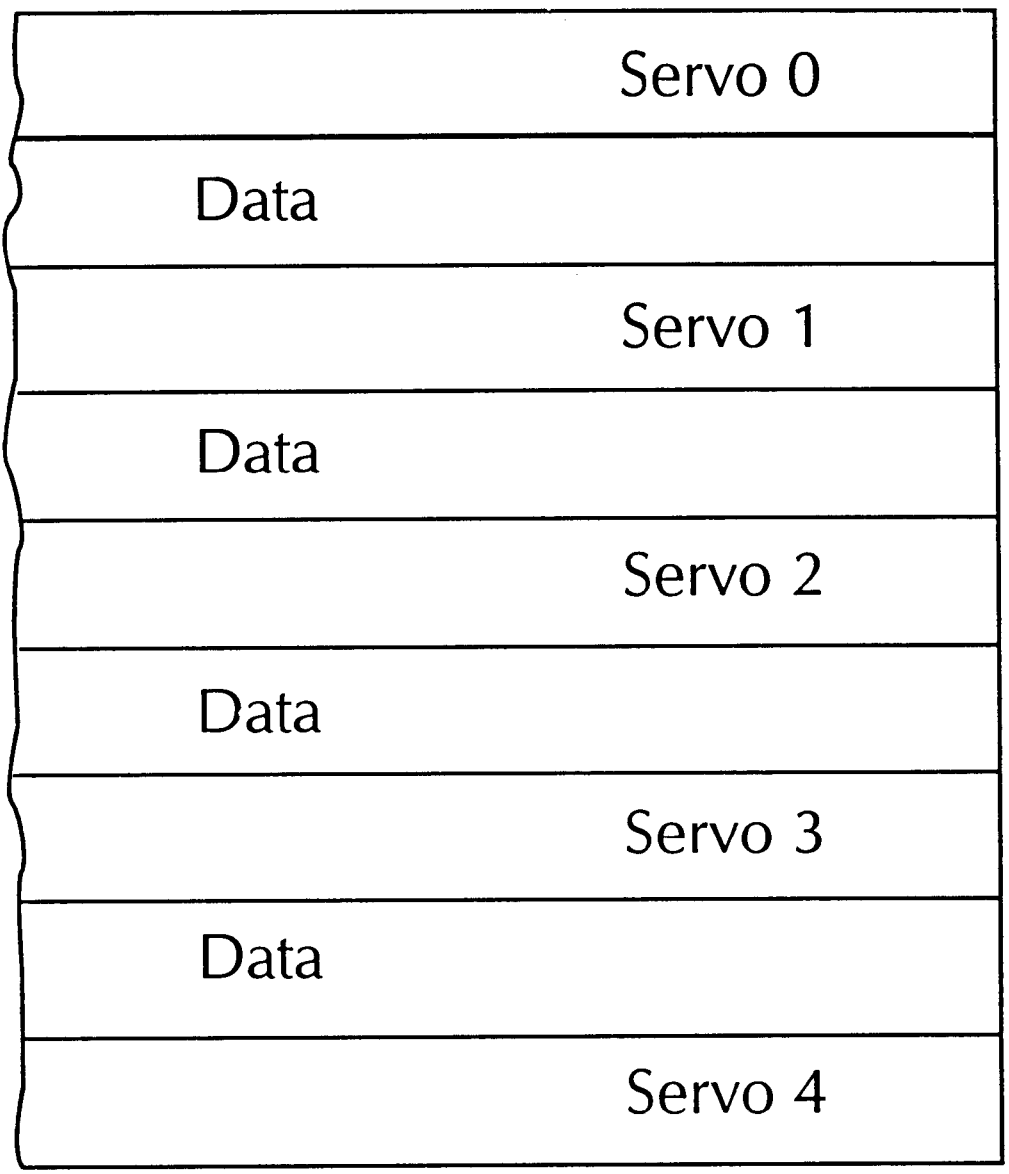
FIG. 1 illustrates the layout of the data bands and servo bands for the LTO format.
Figure 2:
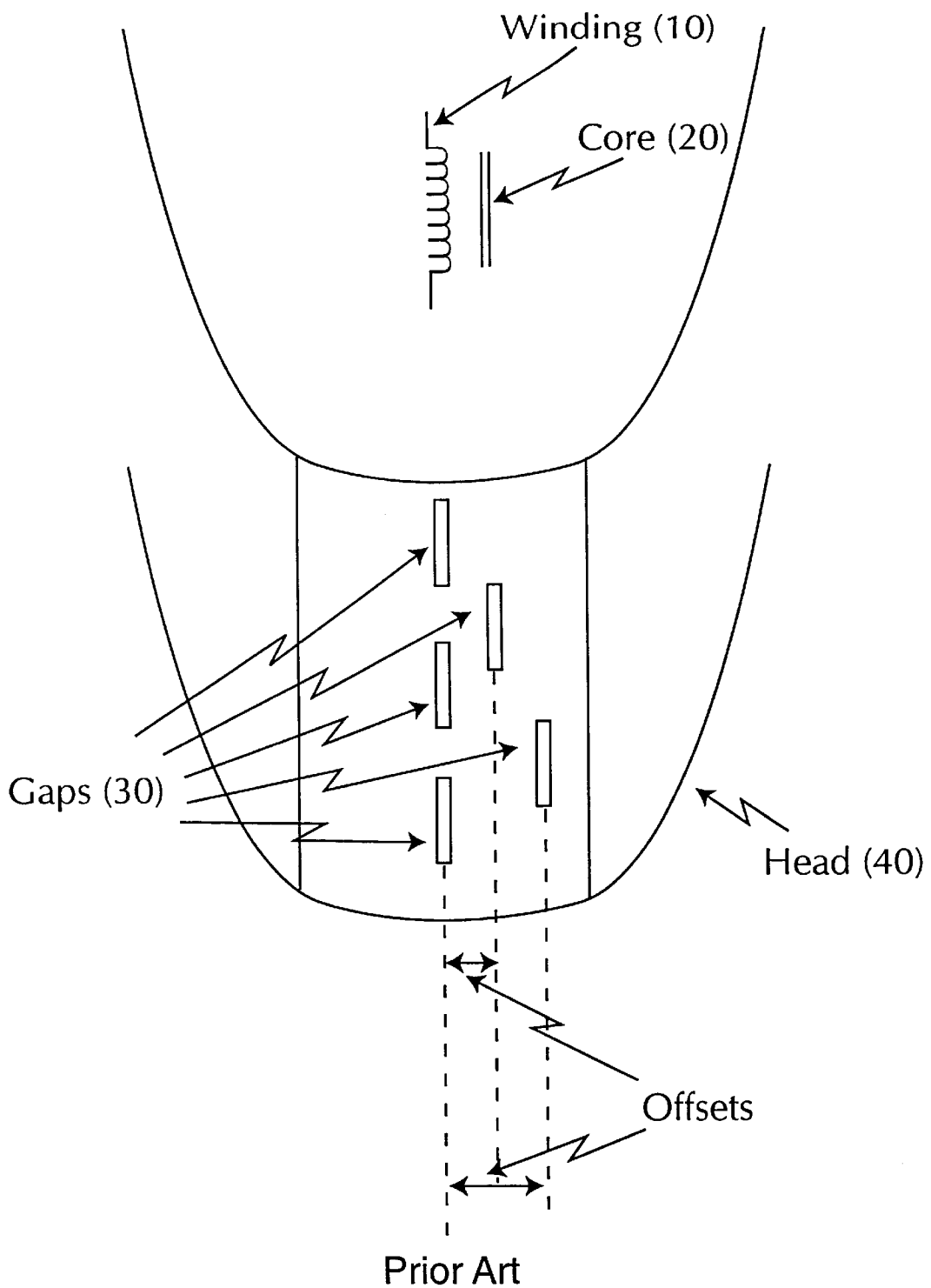
FIG. 2 illustrates a servo write head for the previous approach.
Figure 3:
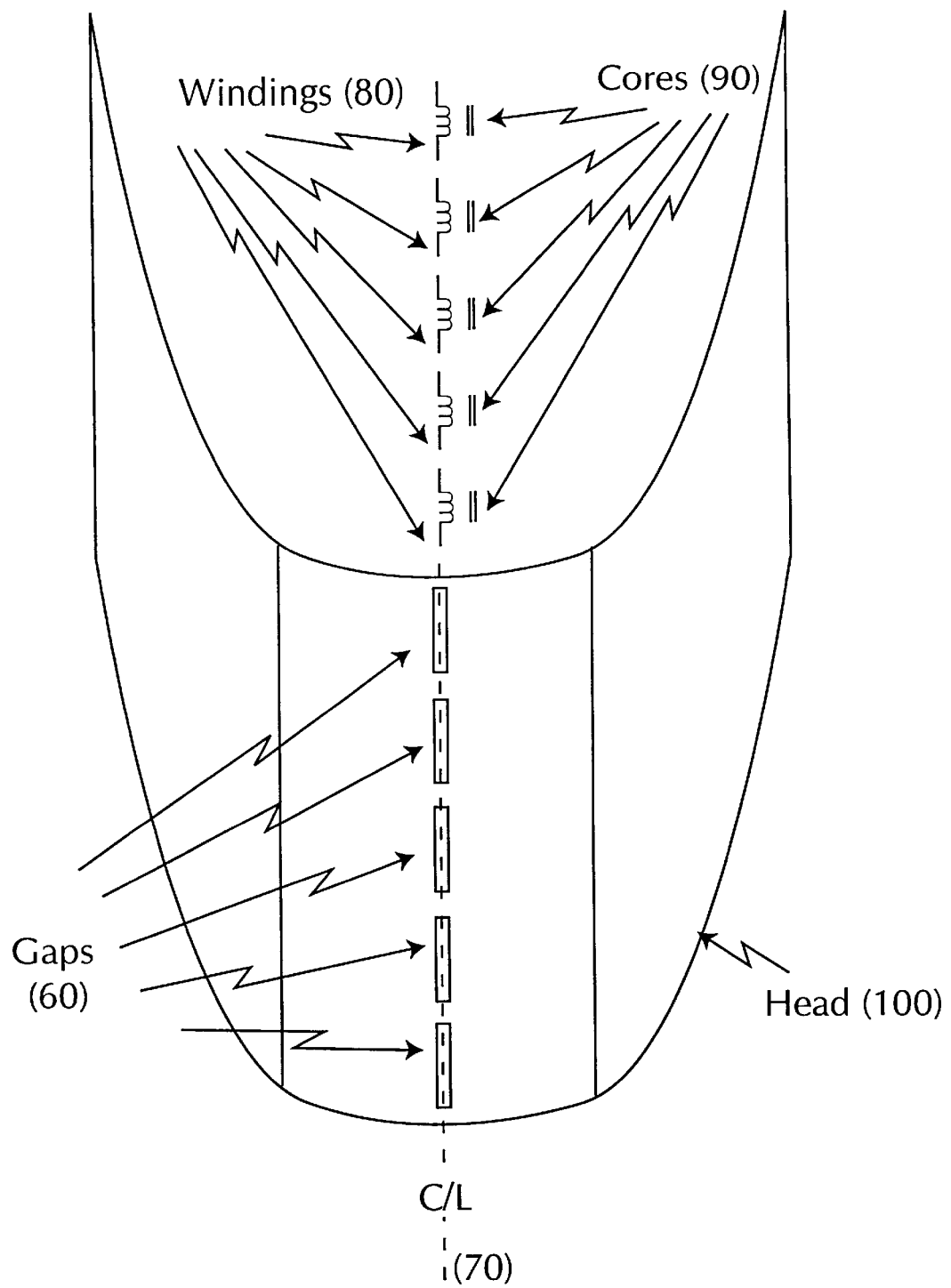
FIG. 3 illustrates a servo write head for the preferred embodiment of the invention.

FIG. 3 illustrates a servo write head for the preferred embodiment of the present invention. Note that FIG. 3 for the preferred embodiment of the present invention differs from FIG. 2 for the previous approach in the following respects as well as other respects. First, the gaps 60 are arranged in head 100 along centerline 70. There are no significant offsets for purposes of offsetting the writing of data in the servo bands relative to other servo bands. Second, there are five independent write windings 80 with independent cores 90 each of which is respectively associated with the five gaps 60. Thus, vertical alignment of five independent windings with separate write cores is provided within head 100.

Figure 4:
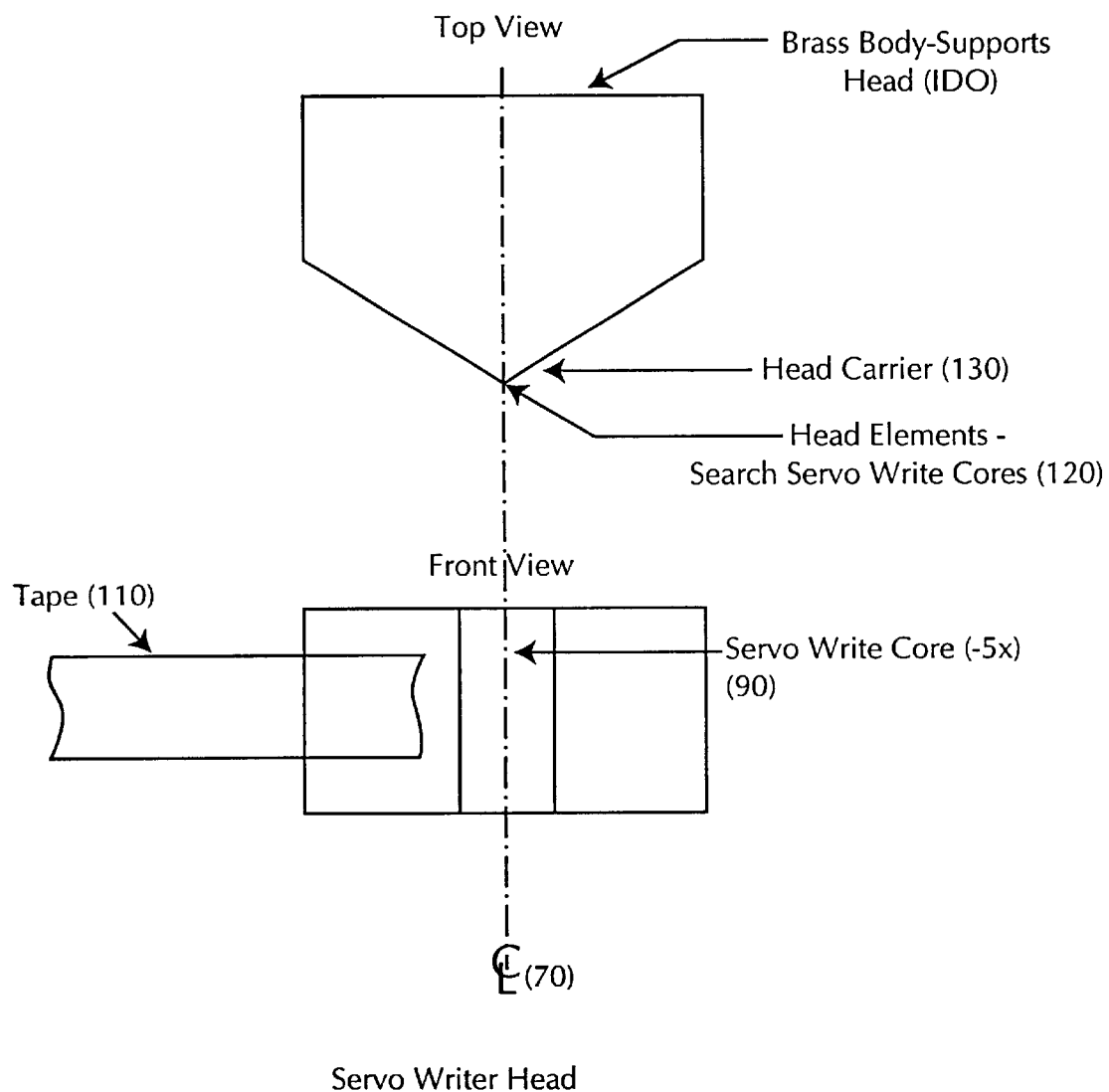
FIG. 4 depicts the preferred embodiment's top view and a front view with a centerline.

FIG. 4 of a servo writer head 100 is another illustration of the preferred embodiment of the present invention. As shown, a tape 110 passes against head elements 120. Head elements 120 contain five servo write cores each with an independent winding. The five servo write cores each with their independent windings are arranged in a vertical manner along center-line 70. Head elements 120 are held in place by head carrier 130 that is in turn held by brass body support head 100. Brass is generally selected for body support head 100 since the magnetic properties for brass are such that it does not interact with the core material used by head elements 120. A material that is more resistant to the abrasiveness of the tape than brass is typically applied to the surface of the head elements 120 to reduce wear. Thus, vertical alignment of five separate write cores with independent windings is provided.

Through this architecture, the present invention overcomes, supercedes and revolutionizes the previous approach of writing data into the servo bands of LTO tapes. This is accomplished through translating physical parameters that were difficult to realize or achieve into electrical parameters that are easily manipulated. The vertical alignment of five separate write cores with independent windings allow this. First, the task of manufacturing a head with precision in the placement of the gaps is eliminated since the timing offset is now a function of the timing of the drive signals to the independent windings rather than the physical location of the gaps. This eliminates heads being discarded due to variation in manufacturing. Second, since the gaps are now arranged vertically across the surface of the head, the tape contact area is minimized, thereby improving head to tape contact. This allows servo data to be encoded at much higher tape speeds. Third, since there are now five independent windings each with respect to each separate core, the inductance of these windings is much less. Therefore, the signal electronics are able to drive the head much more readily. Also, since there are now five windings, any variation between the windings or the magnetic flux density in the gaps may be compensated for in the drive current to the windings. Finally, in the event of a format change, the timing of the signals to the independent windings may be varied to adhere to the new standard.

Figure 5:
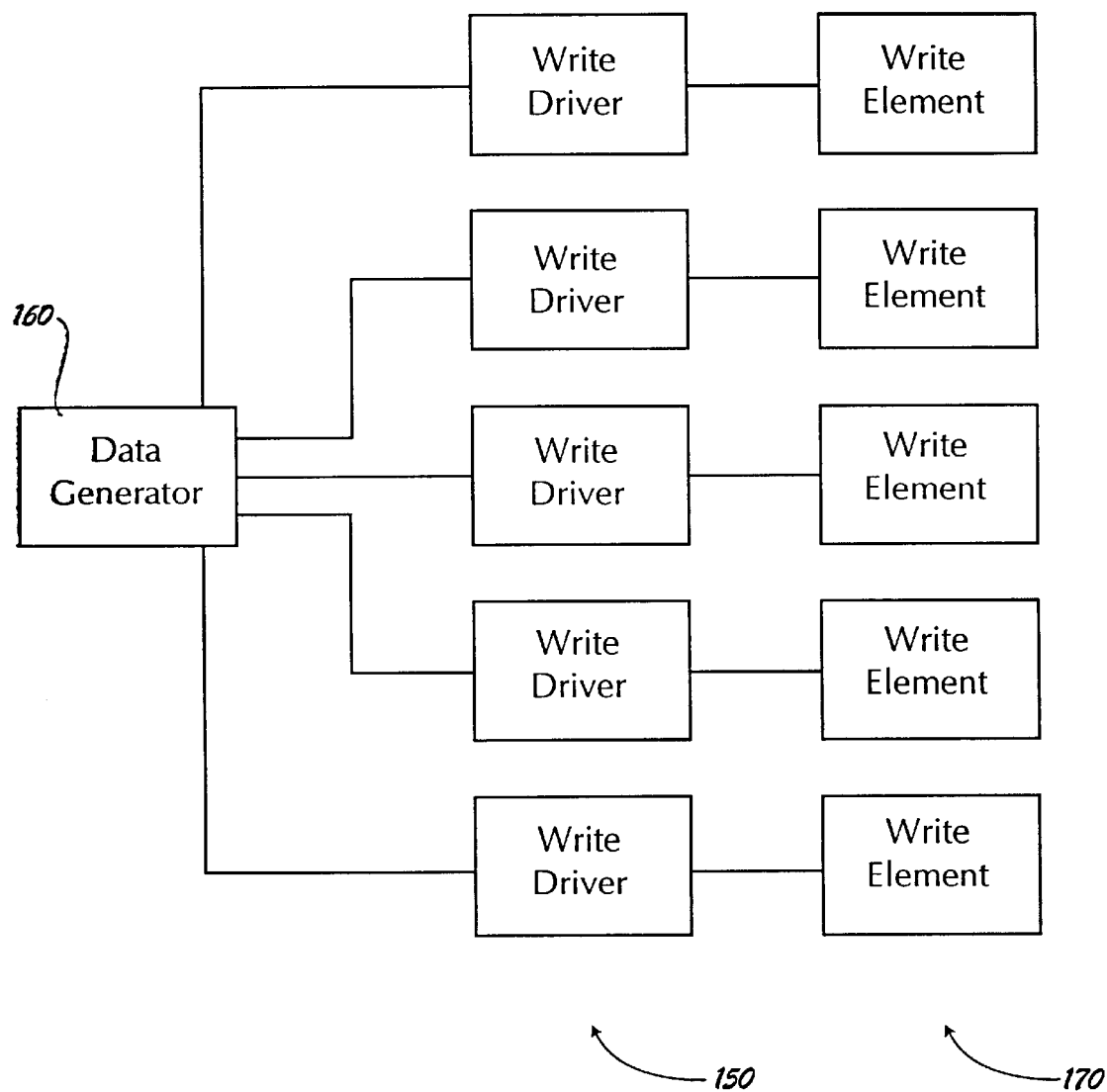
FIG. 5 is a block diagram depicting the data generator and write driver electronics as used within the present invention.

FIG. 5 is a block diagram depicting a data generator 160 and write driver electronics 150 as used within the present invention. The write head of the present invention includes multiple write elements 170 (e.g., multiple servo write cores) aligned vertically and perpendicularly with reference to the magnetic tape media to improve the write performance and flexibility for tape formats such as the previously described LTO format. Within the present invention the term write elements includes components that are used within the head to perform a write operation, such as servo write core components. The servo write core components of the present invention have independent drivers 150 and data generators 160, allowing them to encode data independently on a magnetic tape media. In the preferred embodiment a multi-channel data generator is used. Each servo write core driver 150 is driven by one of the outputs of the multi-channel data generator where each output of the multi-channel generator provides a programmable offset in time from a precision reference.

Each write element is electrically independent of the other write elements since each write element is driven by separate write driver electronics. Each of the write elements receives a write signal consisting of pulses having controlled pulse widths, amplitudes, rise times, fall times, and waveshapes. Thus, one or more of the following write signal characteristics can be varied for a write element: the write signal pulse width provided to at least one write element can be different than the write signal pulse width provided to another write element; the write signal amplitude provided to at least one of the write elements can be different than the write signal amplitude provided to another write element; the write signal rise time provided to at least one of the write elements can be different than the write signal rise time provided to another write element; the write signal fall time provided to at least one of the write elements can be different than the write signal fall time provided to another write element; the write signal waveshape provided to at least one of the write elements can be different than the write signal waveshape provided to another write element.

With such an architecture, the present invention has many significant advantages. For example, the vertical alignment of the write cores of the write head of the present invention minimizes the width of the tape contact area and improves head to tape contact.

The independent control of the write cores allows each band written to the tape to have a variable/programmable write pulse which compensates for manufacturing tolerances on the write gap length.

The programmable timing offset on the five data generators allows the longitudinal positioning of the five servo bands to be trimmed to compensate for manufacturing tolerances in the positioning of individual write cores in the servo head assembly.

The write pulse width as well as the data encoding and timing offset are individually programmable on each of the five write cores/generators. This allows precise compensation for manufacturing tolerances.

The use of five separate data generators allows versatility in the generation of servo tapes for special purposes, such as test tapes with unique longitudinal offsets, data encoding or "watermarking" the tape.

The write current to each of the five write drivers can be varied under program control, allowing optimization of the write current for each write core. This also helps to compensate for manufacturing tolerances.

The above programmability features also allow exact field modifications should the specification change or further optimization be required.

It is to be understood that the invention is not limited to the exact construction illustrated and described above, but that various changes and modifications may be made without departing from the spirit and scope of the inventions as defined in the following claims. For example, the electronics described above can be used for driving a general purpose multi-channel transducer (e.g., not limited to a servo head environment) for achieving greater flexibility.

What is claimed is:

1. A head system for writing a plurality of servo bands onto a magnetic media, said magnetic media having at least one predefined longitudinal direction of travel, said head system comprising:
   a body support structure;
   a plurality of write elements disposed in said body support structure and arranged substantially along a line perpendicular to said longitudinal direction of travel; and
   a system of drivers coupled to said write elements that applies individually timed write signals to said write elements to cause said write elements to magnetically encode a plurality of laterally adjacent servo bands onto said magnetic media that are longitudinally offset relative to said line.

2. The head of claim 1 wherein each of the write elements is electrically independent of the other write elements.

3. The head of claim 2 wherein each of the write elements is driven by separate, independent write driver electronics.

4. The head of claim 3 wherein each write driver is driven by a single channel of a multi-channel data generator.

5. The head of claim 4 wherein timing of the write signals to said write elements is adjusted so that the positions of the servo bands written to the magnetic medium are offset in the longitudinal direction of travel by amounts different from their physical offset in the longitudinal direction of travel.

6. The head of claim 1 wherein said servo bands comprise magnetic transitions having specified physical offsets among the bands across the width and length of the media, wherein said write elements are arranged with physical offsets in the longitudinal direction of travel that differ from the desired physical offsets in the magnetic transitions written to the magnetic medium in the longitudinal direction of travel.

7. The head of claim 1 wherein said write elements are arranged along a common centerline to allow minimizing the width of the contact region between the head and media.

8. The head of claim 1 wherein each write element is electrically independent of the other write elements, wherein each write element is driven by separate write driver electronics, wherein each of the write elements receives a write signal consisting of pulses having controlled pulse widths, amplitudes, rise times, fall times, and waveshapes.

9. The head of claim 8 wherein the write signal pulse width provided to at least one write element is different than the write signal pulse width provided to another write element.

10. The head of claim 8 wherein the write signal amplitude provided to at least one of the write elements is different than the write signal amplitude provided to another write element.

11. The head of claim 8 wherein the write signal rise time provided to at least one of the write elements is different than the write signal rise time provided to another write element.

12. The head of claim 8 wherein the write signal fall time provided to at least one of the write elements is different than the write signal fall time provided to another write element.

13. The head of claim 8 wherein the write signal waveshape provided to at least one of the write elements is different than the write signal waveshape provided to another write element.

14. A head system for writing a plurality of servo bands onto a magnetic media, said magnetic media having at least one predefined longitudinal direction of travel, said head system comprising:
   a body support structure;
   a plurality of write elements disposed in said body support structure and arranged substantially along a line perpendicular to said longitudinal direction of travel; and
   a plurality of independent write drivers each coupled to a different one of said write elements and each applying an individually timed write signal to the write element to which it is coupled,
   said plurality of independent write drivers acting in concert to cause said write elements to magnetically encode a plurality of laterally adjacent servo bands onto said magnetic media that are longitudinally offset relative to said line.

15. The head of claim 14 wherein each write driver is driven by a single channel of a multi-channel data generator.

16. The head of claim 15 wherein said write elements are arranged along a common centerline to allow minimizing the width of the contact region between the head and media, thereby providing improved contact between the head and media.

* * * * *

UNITED STATES PATENT AND TRADEMARK OFFICE
CERTIFICATE OF CORRECTION

PATENT NO.   : 6,433,949 B1
DATED        : August 13, 2002
INVENTOR(S)  : Michael Murphy et al.

It is certified that error appears in the above-identified patent and that said Letters Patent is hereby corrected as shown below:

<u>Title page,</u>
Item [56], OTHER PUBLICATIONS, "prodhd-data/whitehd-11.html" should be
-- prod_data/white_1.html --.

Signed and Sealed this

Fourth Day of February, 2003

JAMES E. ROGAN
*Director of the United States Patent and Trademark Office*